United States Patent
Bird et al.

[19]

[11] Patent Number: 6,065,562
[45] Date of Patent: May 23, 2000

[54] SYSTEM FOR IMPARTING COMPRESSIONAL AND SHEAR WAVES INTO THE EARTH

[75] Inventors: James M. Bird; James M. Bird, Jr.; Elmo W. Christensen; Michael G. Grady, all of Tulsa, Okla.

[73] Assignee: Industrial Vehicles International, Inc., Tulsa, Okla.

[21] Appl. No.: 09/123,134

[22] Filed: Jul. 27, 1998

[51] Int. Cl.[7] .................................................. G01V 1/02
[52] U.S. Cl. .......................... 181/113; 181/113; 181/101; 181/108; 181/121; 181/139; 181/142; 181/400; 181/401; 367/14; 367/15; 367/75; 367/37; 367/189; 367/140; 116/137 R; 116/142 FP; 116/DIG. 7; 116/DIG. 18; 92/51; 92/52; 92/53
[58] Field of Search .................. 181/113, 101, 181/108, 121, 139, 142, 401, 400; 367/15, 14, 75, 37, 189, 140; 116/137 R, 142 FP, DIG. 7, DIG. 18; 92/51, 52, 53

[56] References Cited

U.S. PATENT DOCUMENTS

| | | | |
|---|---|---|---|
| 3,143,181 | 8/1964 | Bays et al. | 181/5 |
| 3,306,391 | 2/1967 | Bays | 181/5 |
| 3,745,885 | 7/1973 | Fair et al. | 91/216 R |
| 3,777,843 | 12/1973 | Fair et al. | 181/5 |
| 4,114,722 | 9/1978 | Weber et al. | 181/114 |
| 4,321,981 | 3/1982 | Waters | 181/119 |
| 4,655,314 | 4/1987 | Airhart | 181/113 |
| 4,660,674 | 4/1987 | Airhart | 181/113 |
| 4,660,675 | 4/1987 | Airhart | 181/113 |
| 4,662,473 | 5/1987 | Betz | 181/113 |
| 4,664,222 | 5/1987 | Jones et al. | 181/113 |
| 4,709,362 | 11/1987 | Cole | 367/189 |
| 4,718,049 | 1/1988 | Crowell et al. | 367/189 |
| 4,719,607 | 1/1988 | Airhart | 367/189 |
| 4,735,280 | 4/1988 | Cole | 181/113 |
| 4,785,430 | 11/1988 | Cole | 367/189 |
| 4,785,431 | 11/1988 | Myers | 367/189 |
| 4,805,725 | 2/1989 | Paulsson | 181/106 |
| 4,848,512 | 7/1989 | Airhart | 181/114 |
| 4,853,907 | 8/1989 | Bays | 367/189 |
| 4,867,096 | 9/1989 | Cole | 181/114 |
| 4,922,473 | 5/1990 | Sallas et al. | 367/189 |
| 4,980,874 | 12/1990 | Justice, Jr. | 367/190 |
| 5,187,331 | 2/1993 | Sakata | 181/121 |
| 5,396,029 | 3/1995 | Talke | 181/114 |
| 5,401,919 | 3/1995 | Crowell et al. | 181/121 |
| 5,666,328 | 9/1997 | Crowell et al. | 367/189 |
| 5,694,375 | 12/1997 | Woodall | 367/185 |
| 5,703,833 | 12/1997 | Allen | 367/46 |
| 5,710,720 | 1/1998 | Algrain et al. | 364/574 |
| 5,717,170 | 2/1998 | Anstey | 181/121 |

*Primary Examiner*—David S. Martin
*Assistant Examiner*—Edgardo San Martin
*Attorney, Agent, or Firm*—Head, Johnson & Kachigian

[57] ABSTRACT

A seismic vibrator system for imparting compressional and shear wave vibrations into the earth has an earth contacting base with a vertical post. A tubular hub is slidably received on the post in a piston/cylinder relationship. Spaced apart horizontal top and bottom plates are secured to the hub. A mass is slidably supported between the plates. Pistons interconnect the hub and the mass. Hydraulic energy is used to reciprocate the mass vertically on the post and horizontally between the plates.

22 Claims, 4 Drawing Sheets

SYSTEM FOR IMPARTING COMPRESSIONAL AND SHEAR WAVES INTO THE EARTH

REFERENCE TO PENDING APPLICATIONS

This application is not related to any pending applications.

REFERENCE TO MICROFICHE APPENDIX

This application is not referenced in any microfiche appendix.

BACKGROUND OF THE INVENTION

The present invention provides an improved system for generating in the earth's surface seismic signals that can be used in geophysical exploration.

Geophysical exploration, or more precisely seismic exploration, involves the introduction of energy into the earth. Energy waves generated at the earth's surface travel through the earth and when an energy wave encounters a strata which has a different velocity or density a small portion of the energy wave is reflected back which can be detected at the earth's surface. The reflected signals can be analyzed to estimate the shape, composition, depth and size of various strata within the earth and this information is employed in predicting where oil, gas or other valuable minerals may be located.

Seismic wave producing energy is induced into the earth surface for purposes of conducting seismic exploration in two basic formats, that is, compression waves (sometimes known as P-waves) and orthogonal shear waves (sometimes known as S1 and S2 type waves). Simply stated, compressional waves are typically generated by oscillating or vibrating weight along a vertical axis to the earth's surface whereas shear waves are typically generated by oscillating or vibrating weight along an axis that is inclined from the vertical.

For background information relating to seismic signal generating systems, reference may be had to the following previously issued United States patents:

| U.S. Pat. No. | INVENTOR | TITLE |
| --- | --- | --- |
| 5,666,328 | Crowell et al | Three Axis Seismic Vibrator |
| 5,694,375 | Woodall | Ultra-Broadband Hydrophone |
| 5,703,833 | Allen | One Step Inversion/Separation Scheme Using A Plurality Of Vibrator Sources |
| 5,710,720 | Algrain et al | Phase Lock Loop Based System and Method For Decomposing and Tracking Decomposed Frequency Components Of A Signal, With Application To Vibration Compensation System |
| 5,717,170 | Anstey | Swinging-Weight Vibrator For Seismic Exploration |

The United States patent references cited in U.S. Pat. No. 5,666,328 contain additional background information relating to the subject of this disclosure.

BRIEF SUMMARY OF THE INVENTION

The invention disclosed herein relates to a system for imparting compressional and shear waves into the earth. Compressional waves are sometimes referred to as "P-waves" and shear waves are sometimes referred to as "orthogonal waves" or "S1 or S2 waves". The system includes an earth engaging baseplate that preferably has on its bottom surface an undulating shape to resist slipping so that thereby orthogonal vibrations can be more effectively transferred to the earth's surface.

A post is uprightly supported from the baseplate. A tubular hub is slidably received on the post. A vertical and laterally translatable mass is supported to the hub. A translation system which, in the illustrated embodiment, is a hydraulic cylinder/piston apparatus, is employed that, when activated, imparts reciprocal vertical movement of the mass relative to the hub, which motion is transferred by the post to the baseplate for imparting compressional energy waves into the earth.

A second translation assembly that, in the illustrated embodiment includes a cylinder/piston device, is employed to impart reciprocal lateral movement of the mass relative to the hub which results in orthogonal vibration transferred to the baseplate which is thereby transferred into the earth as seismic shear waves.

In a preferred embodiment of the invention, spaced apart generally horizontal top and bottom plates are supported to the hub and thereby to the post. Slidably positioned between the top and bottom plates is a mass having an upper and a lower surface that slidably contacts horizontal surfaces of the top and bottom plates, the mass having an opening through it that receives the vertically extending post. Hydraulically actuated cylinder/piston devices are employed to impose reciprocal or vibrational motion of the mass sliding between the top and bottom plates. The top and bottom plates may be simultaneously moved downwardly on the post so that the bottom plate securely engages the baseplate so that reciprocal motion of the mass between the top and bottom plates is transferred directly to the baseplate.

The disclosure includes, in an addition to the apparatus for imparting compressional and shear waves into the earth, a method by which the waves are imparted. The method includes the steps of positioning a baseplate in contact with the earth's surface, the baseplate having a vertical post extending uprightly therefrom. The second step of the method is supporting a mass on the baseplate. Thereafter the mass is selectably vertically vibrated to impart compressional wave energy to the baseplate and selectably laterally vibrated when it is desired to impart shear wave energy to the base.

A better understanding of the invention will be obtained from the following description of the preferred embodiment, taken in conjunction with the attached drawings.

DESCRIPTION OF THE DRAWINGS

FIG. 1 shows, below the machine baseplate, a shear wave adapter plate that can be secured to the baseplate to better adapt the machine for coupling on certain ground surfaces.

DETAILED DESCRIPTION OF THE PREFERRED EMBODIMENTS

Figure 1:
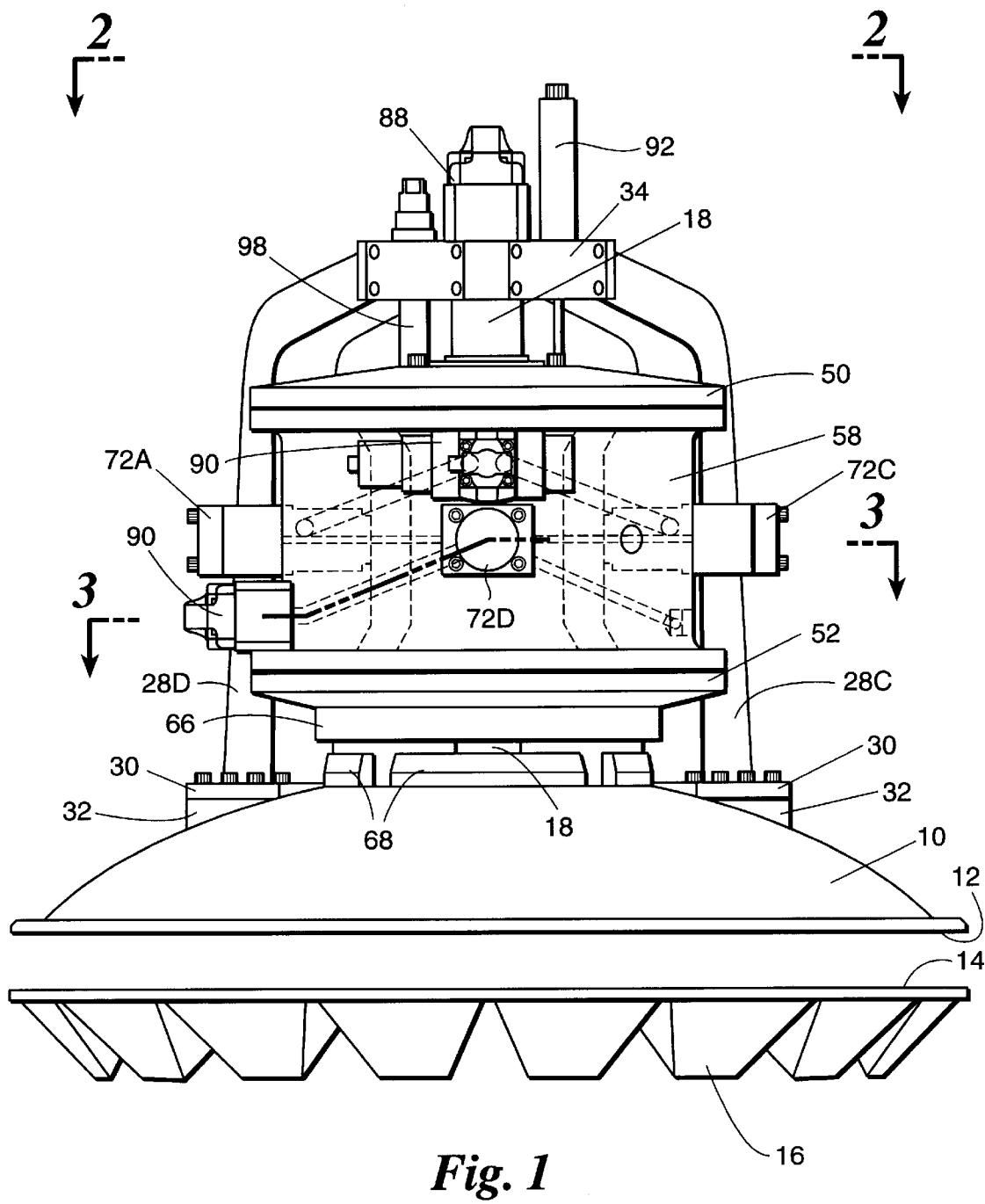
FIG. 1 is an elevational view of a machine for generating compressional and shear waves for use in seismic exploration.
Figure 2:
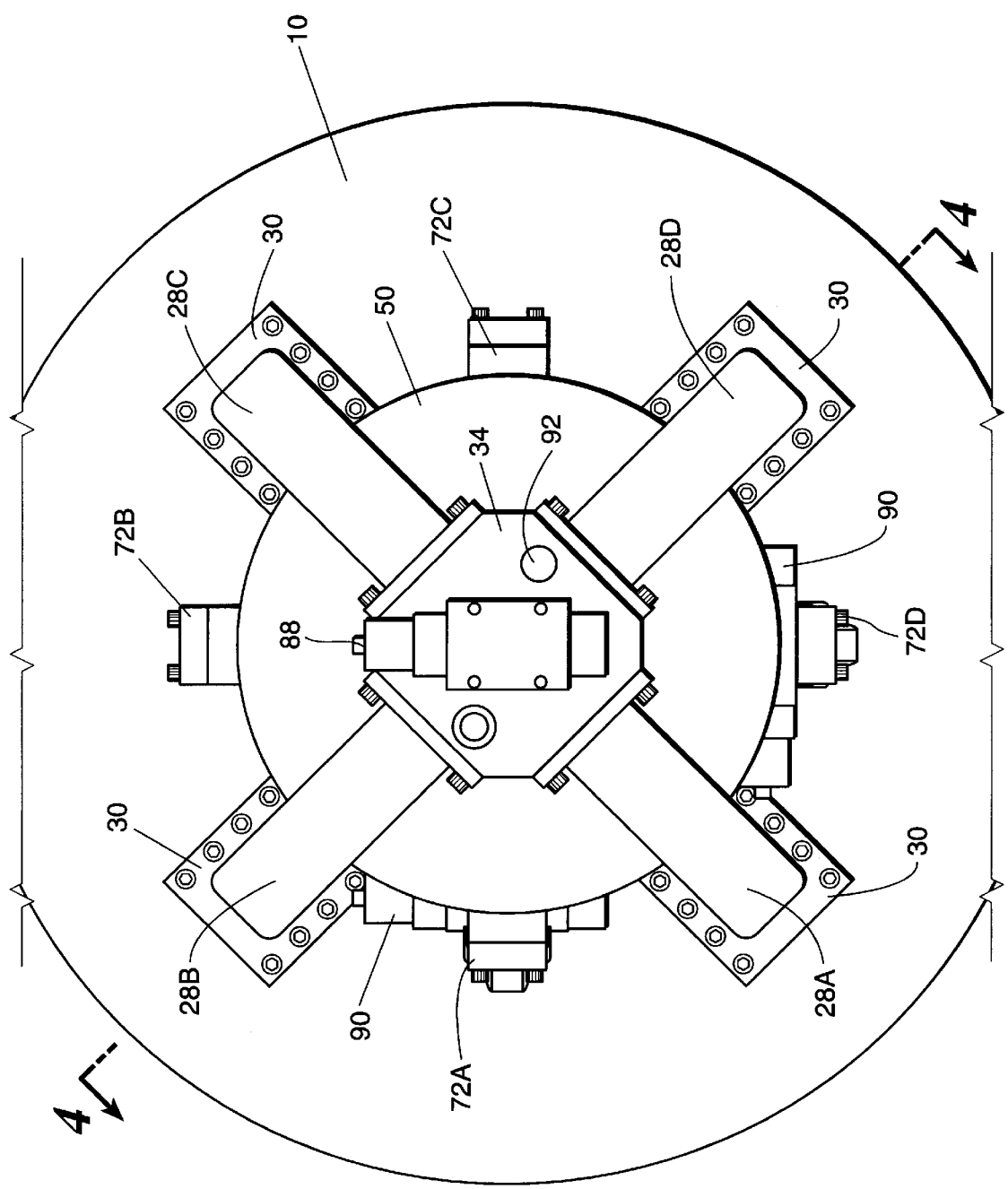
FIG. 2 is a top plan view of the machine of FIG. 1 as taken along the line 2—2 of FIG. 1.
Figure 4:
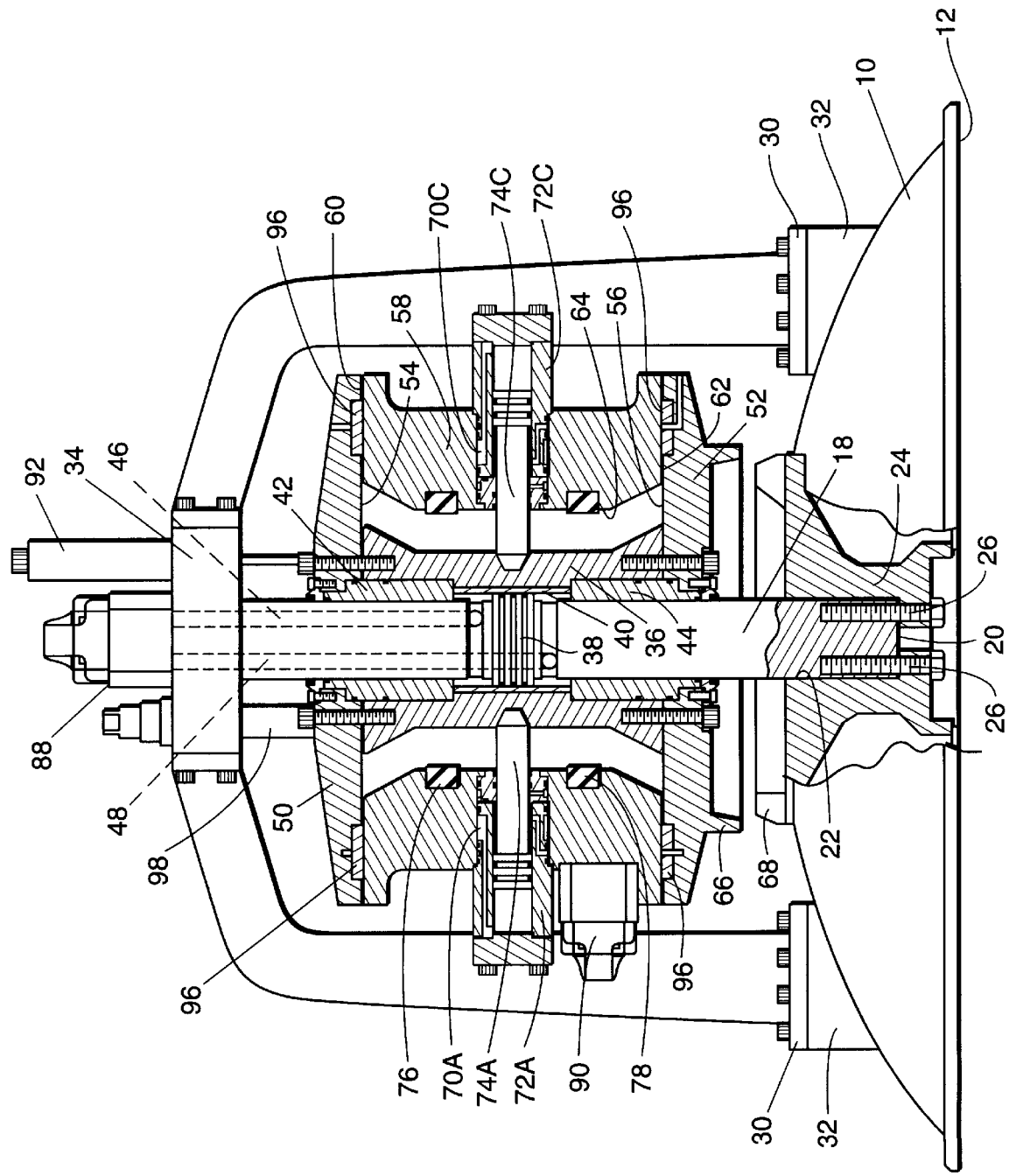
FIG. 4 is an elevational cross-sectional view taken along the line 4—4 of FIG. 2 in which the stilt legs are rotated 45°, that is, wherein the stilt legs are shown in elevational view and not in cross-section.

Referring first to FIGS. 1 and 2, the basic components of the system for imparting compressional and shear waves into the earth are illustrated. A baseplate 10 has a bottom surface 12 configured to engage the earth's surface. The bottom surface 12 is preferably essentially planar when the machine is used for generating compressional waves, that is, where the vibrational energy is imposed along a vertical axis into the earth's surface. Shown in FIG. 1, but not in FIG. 4, is an adapter plate 14 that can be removably secured to the bottom surface 12 of baseplate 10, the adapter plate having an undulating lower surface 16 that is configured to substantially increase resistance against lateral displacement when placed against the earth's surface. Adapter plate 14 can be secured to baseplate 10 such as by means of bolts or clamps (not shown). If the machine of this invention is to be used substantially exclusively for imparting shear wave energy into the earth's surface baseplate 10 can have an undulating bottom surface, such as surface 16 of the shear wave adapter plate. By the embodiment illustrated in FIG. 1 the adapter plate 14 may be used as required by the operator according to the specific type of seismic exploration being conducted and depending upon whether the emphasis is the creation of compressional and shear waves, it being understood that with adapter plate 14 attached, the machine can be employed to generate either shear or compressional waves.

Axially affixed to baseplate 10 and extending vertically uprightly from it is a post 18. The lower end 20 (See FIG. 4) of post 18 is secured to baseplate 10. In the illustrated arrangement the end of post 18 is positioned in a recess 22 in a baseplate hub portion 24. By means of bolts 26, post 18 is securely affixed to the baseplate or, more specifically, to baseplate hub 24.

Figure 3:
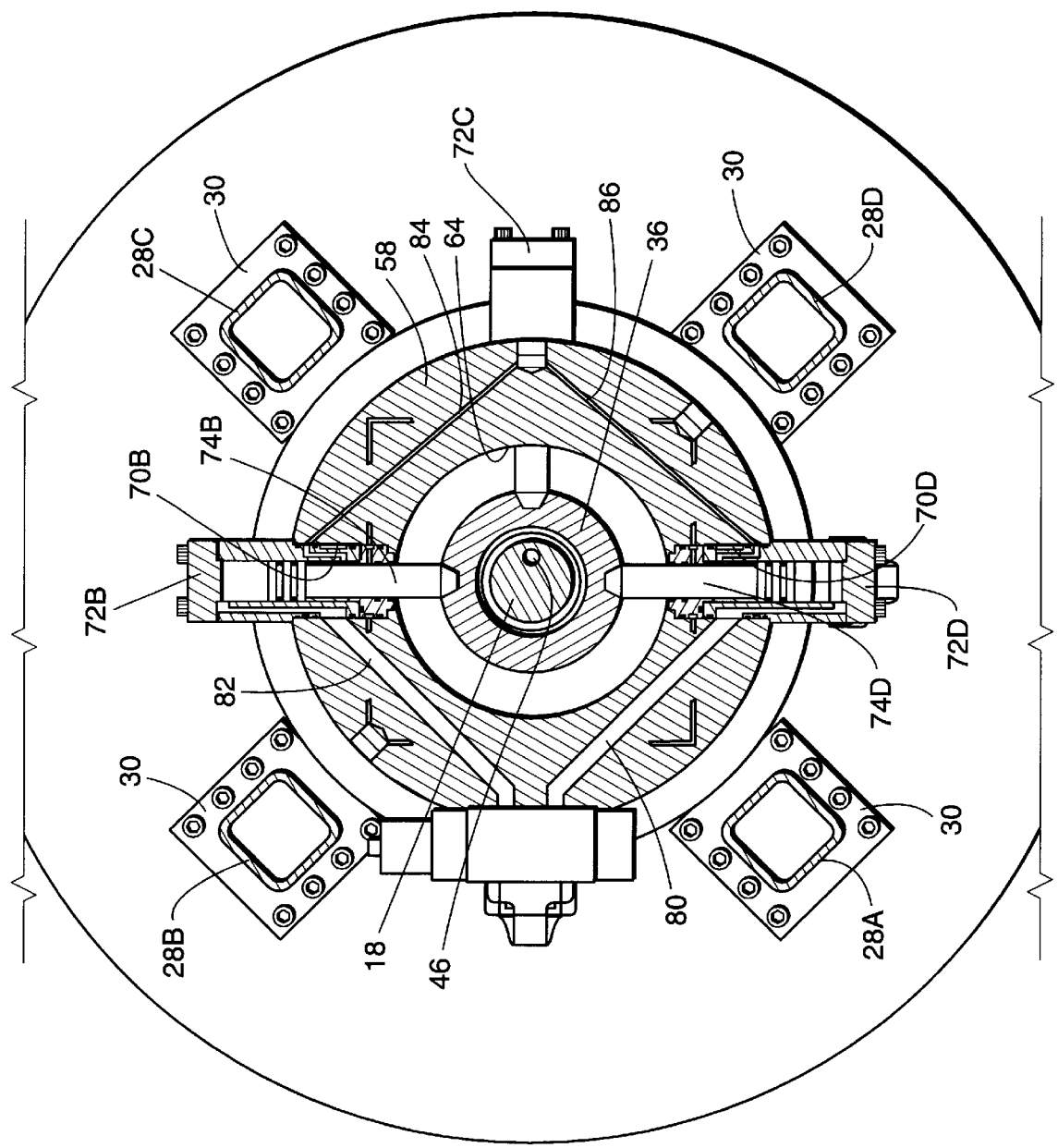
FIG. 3 is a horizontal cross-sectional view as taken along the line 3—3 of FIG. 1 showing more details of the construction of the compressional and shear wave generating machine.

The upper end of post 18 is laterally supported by the upper end portion of stilt legs. In the illustrated embodiment there are four stilt legs 28A through 28D. FIG. 3 shows the four stilt legs in cross-section. Each of the legs has at its lower end a baseplate 30 that is secured to a mounting boss 32 attached to baseplate 10 (See FIGS. 1 and 4). In FIG. 1 the most forward stilt legs 28A and 28D (Seen in FIGS. 2 and 3) are not shown so as not to obscure other features of the vibrator. Stilt legs 28 are curved at their upper ends and the upper end portions oriented inwardly to a top manifold 34 to which an upper end portion of post 18 is attached.

Reciprocally supported on post 18, as best seen in FIGS. 3 and 4, is a tubular hub 36. Also as shown in FIGS. 3 and 4 post 18 has, intermediate its upper and lower ends, a machined portion forming a piston 38. As seen in FIG. 4, piston 38 is formed by a machined surface having three circumferential grooves, each of which receives a sealing ring. An interior portion of hub 36 receives a tubular sleeve 40 that is held in place between upper and lower tubular adapters 42 and 44. The interior cylindrical surface of sleeve 40 functions as a cylinder that receives post piston portion 38. Internal passageways 46 and 48 are formed interiorly of the upper portion of post 18 communicating between the upper and lower ends of piston 38. By the application of relative hydraulic pressure between passageways 46 and 48, force can be imparted to move hub 36 upwardly or downwardly on shaft 38. The tubular adapters 42 and 44 function to provide circumferential bearing surfaces against the external cylindrical surface of the post to slidably guide the hub in its vertical up and down motion on the post.

Affixed to the upper end of hub 36 is a top plate 50 and to the lower end of the hub a bottom plate 52. Top plate 50 has a lower, planar, horizontal surface 54 that is parallel to and spaced apart from a similar planar, horizontal surface 56 formed on bottom plate 52. Slidably positioned between the top and bottom plate surfaces 54 and 56 is a mass 58, the mass having a top planar surface 60 and a bottom parallel planar surface 62, the mass top surface 60 sliding on top plate surface 54 and the mass bottom surface 62 sliding on bottom plate top surface 56.

Mass 58 is, in the illustrated embodiment, of circular external configuration and has integrally increased external diameter flange portions at the top and bottom as seen in FIGS. 1 and 4. Mass 58 further is defined by an opening 64 that receives post 18 and hub 36. Opening 64 permits mass 58 to be moved laterally of the hub and the post in any direction and such a lateral movement is employed to impart orthogonal seismic wave generating energy to post 18 and more specifically, to baseplate 10. To assist in communicating lateral vibrational energy or shear wave energy to baseplate 10, bottom plate 52 has on its lower surface a circumferential downwardly extending lip portion 66 (FIGS. 1 and 4) that, when the mass assembly is translated downwardly on post 18 meshes with and rests on a circumferential clamping member 68 at the upper surface of baseplate 10 or more specifically, to baseplate hub portion 24. When there is no hydraulic energy applied to either side of post piston 38 the weight of the mass assembly causes the assembly to slide downwardly on post 18 until the bottom plate lip portion 66 engages clamping member 68 to interlock the mass assembly to baseplate 10. This interlocking relationship can be increased by the application of hydraulic energy to impart high hydraulic pressure to the area within piston sleeve 40 above post piston portion 38 to force the mass assembly downwardly into increased locking engagement with baseplate 10.

FIGS. 1 and 4 show the system in the relationship of components wherein it is being employed to generate compressional waves, that is, wherein the system is in condition for vibration of the mass assembly vertically with respect to the baseplate. When the assembly is in condition for imparting shear waves into the earth, the mass assembly is lowered to rest upon the baseplate and to interlock the lip portion 66 with clamping member 68.

Mass 58 has four lateral openings therein, openings 70A and 70C being seen in FIG. 4 and openings 70B and 70D being seen in FIG. 3. The openings 70 are in a common horizontal plane and are oriented 90° to each other. Each of these openings receives a cylinder assembly 72 and each cylinder assembly receives a piston 74. The cylinder/piston assemblies 72, 74 are employed to move mass 58 laterally with respect to hub 36. That is, as seen in FIG. 4, hydraulic energy can be reciprocally applied to the opposed cylinder assemblies 72A and 72C to cause pistons 74A and 74C to move mass 58 first to the right and then to the left. In addition, hydraulic pressure can be applied to fully withdraw pistons 74 away from engagement with hub 36. When cylinder assemblies 72A and 72C in combination with pistons 74A and 74C are employed to oscillate mass 58 laterally with respect to hub 36, then pistons 74B and 74D are fully withdrawn so as not to interfere with the lateral oscillation of mass 58 relative to the hub. In like manner, when pistons 74B and 74D (FIG. 3) are employed to laterally reciprocate the mass relative to the hub, then the pistons 74A and 74C (FIG. 4) are fully withdrawn from any contact with the hub.

As seen in FIG. 4, mass 58 has on the interior surface of opening 64 upper and lower circumferential grooves which receive toroidal elastomeric bumpers 76 and 78.

FIG. 3 illustrates passageways 80, 82, 84 and 86 formed within mass 58 to provide for the flow of hydraulic fluid by which the pistons are controlled. Servovalves 88 and 90 (FIG. 1) are employed to control the hydraulic system. Servovalve 88 is secured to the upper end of top manifold 34 while servovalve 90 is mounted to and moves with mass 58 for use in controlling the operation of the system, specifically for controlling the flow of hydraulic fluid to reciprocate the mass vertically or laterally. A displacement sensor assembly 92 provides an output signal employed to supply feedback for control of the machine.

While element 58 is a "mass", in the compression wave mode the entire assembly which includes hub 36, top plate 50, bottom plate 52, mass 58, cylinder assemblies 72A through 72D and pistons 74A through 74D together constitutes an entire mass assembly that is moved sequentially vertically up and down on the post to impart compressional wave energy to baseplate 10. When the system is employed in the shear wave mode the mass assembly is lowered to rest upon baseplate 10 by the engagement of the lip portion 66 of bottom plate 52 with the clamp member 68 so that the shear wave energy is generated entirely by the lateral translation of mass 58 as supported between the top and bottom plates. It is important that mass 58 reciprocate freely as supported between the top and bottom plates and for this purpose bearing surfaces 96 are provided. To further insure a low friction relationship between the mass and the plates, the bearing surfaces may be force lubricated and passageways are illustrated which can be employed for this purpose.

The hydraulic circuitry of the system is not shown since it can vary in substantial detail and the means for reciprocally applying hydraulic energy to cause vibration of a mass is well known. Commercially available components can be used in the construction of hydraulic circuitry. Although not shown in the drawings the assembly requires a source of hydraulic pressure which can be a separate system employing a hydraulic pump with flexible hoses connecting source of hydraulic pressure to the system.

When the system is to be used to impart compressional waves the first step is to lift the mass assembly out of engagement with baseplate 10 to an intermediate position as shown in FIGS. 1 and 4. Next, the hydraulic system is controlled to engage all pistons 74A through 74D so that they will restrain horizontal movement of mass 58 with the vertical movement of hub 36 on post 18. Then by the application of hydraulic energy through passageways 46 and 25M, the mass assembly vertically moved on post 18 impart vibrational energy to baseplate 10. This vertical vibrational energy is coupled to the earth and generate compressional energy waves in the earth that function as seismic signals, reflection of such seismic signals being detectable by well known seismic exploration systems that include geophones and other instrumentation. The rate of vibration, that is, the signal cycles per second can be varied as controlled by the hydraulic energy applied to the device.

When the device is used to generate shear waves the mass assembly is lowered to rest upon baseplate 10 and the hydraulic system is controlled to withdraw contact of one pair of opposed pistons with hub 36 while the other pair of opposed pistons is supplied reciprocally with hydraulic fluid pressure to cause the mass to oscillate laterally with respect to the hub. By alternately actuating one set of cylinder/pistons with the opposed set of cylinder/pistons the orientation of shear wave energy imparted into the earth can be varied by 90° relationship, without moving or otherwise changing the machine and only by alternately controlling the way hydraulic fluid pressure is applied. Thus, the system can be used selectively to impart either compressional seismic signals or orthogonal, that is, shear wave seismic signals into the earth and the orientation of the shear wave signals can be selectively changed between 90° orientations without requiring the device to be moved.

Since the mass assembly including the top and bottom plates 50 and 52 are all supported about the post 18 it is important that a means be provided to prevent the rotation of the cylindrical mass while the system is being used, particularly when used to generate shear wave energy. For this purpose an anti-rotational pin and bushing assembly 98 (FIGS. 1 and 4) is employed that functions to freely permit the vertical movement of the mass, including top plate 50, but which resists the rotation of the mass assembly about post 18.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed:

1. A vibrator for imparting compressional and shear waves into the earth comprising:
   an earth engaging baseplate;
   a post uprightly extending from said baseplate;
   a tubular hub slidably received on said post;
   a mass laterally translatably supported to said hub;
   a first translation assembly that, when activated, imparts reciprocatable vertical movement of said mass relative to said hub; and
   a second translation assembly that, when activated, imparts reciprocal lateral movement of said mass relative to said hub.

2. A vibrator according to claim 1 wherein said first translation assembly includes a piston/cylinder relationship between said post and said hub.

3. A vibrator according to claim 1 wherein said second translation assembly is a piston/cylinder coupling between said mass and said hub.

4. A vibrator according to claim 1 including a top and a spaced apart bottom plate each secured to said hub and wherein said mass is slidably supported between said top and bottom plates.

5. A vibrator according to claim 1 including spaced apart frame members each having their lower ends attached to said base and their upper ends in connecting support of an upper end portion of said post.

6. A vibrator according to claim 2 wherein said post has on the exterior thereof a portion forming a piston and said hub includes an internal cylindrical surface, at least a portion of which forms a cylinder surface slidably engaged by said piston.

7. A vibrator according to claim 4 wherein said mass has a central opening therethrough loosely receiving said hub.

8. A vibrator according to claim 7 wherein said mass has a top surface and a bottom surface and including a fist bearing relationship between said mass top surface and said top plate and a second bearing relationship between said mass bottom surface and said bottom plate.

9. A vibrator according to claim 7 wherein said mass has a lateral opening therein and:

a cylinder member secured within said lateral opening; and a piston having an outer portion reciprocally received within said cylinder member and an inner end in engagement with said hub, said cylinder member and said piston forming said second translation assembly for imparting reciprocal lateral movement to said hub.

10. A system for imparting compressional and shear waves into the earth comprising:

an earth engaging baseplate;

a post fixedly supported vertically uprightly from said base;

a mass vertically reciprocally supported by said post;

first independently operable means to vertically reciprocate said mass relative to said post to impart compressional wave generating energy to said baseplate; and second independently operable means to laterally reciprocate said mass relative to said baseplate to impart shear wave generating energy to said baseplate.

11. A system according to claim 10 wherein said means to vertically reciprocate said mass relative to said post includes a piston/cylinder relationship between said post and said mass.

12. A system according to claim 10 wherein said means to laterally reciprocate said mass relative to said baseplate is a piston/cylinder coupling between said post and said hub.

13. A system according to claim 10 including a top plate and a spaced apart bottom plate each having an active surface that is normal to said post, said top and bottom plates being secured to said hub and wherein said mass is slidably supported between said active surfaces of said top and bottom plates.

14. A system according to claim 10 including spaced apart frame members each having their lower ends attached to said base and their upper ends in connecting support of an upper end portion of said post.

15. A system according to claim 10 wherein said mass is vertically supported by said post in a first mode when compressional waves are generated by vertical reciprocation of said mass and wherein said mass is supported by said baseplate in a second mode when shear waves are generated by lateral reciprocation of said mass.

16. A system according to claim 11 including a tubular hub slidably received on said post and wherein said post has on the exterior thereof a portion forming a piston and said hub includes an internal cylindrical surface, at least a portion of which forms a cylinder surface slidably engaged by said piston, said mass being supported by said hub, said post portion forming a piston and said hub thereby providing said piston/cylinder coupling between said mass and said post.

17. A system according to claim 13 wherein said mass has a central opening therethrough loosely receiving said post.

18. A system according to claim 17 wherein said mass has a top surface and a bottom surface and including a fist bearing relationship between said mass top surface and said top plate active surface and a second bearing relationship between said mass bottom surface and said bottom plate active surface.

19. A system according to claim 17 wherein said mass has a lateral opening therein and wherein said means to laterally reciprocate said mass relative to said baseplate is positioned at least partly within said lateral opening.

20. A method for imparting compressional and shear waves into the earth comprising the steps of:

(1) positioning a baseplate in contact with the earth's surface, the baseplate having a vertical post extending uprightly therefrom;

(2) supporting a mass to said post, (3) selectively vertically vibrating said mass relative to said post to impart compressional wave energy to said base; and (4) selectively slidably laterally displacing said mass on a horizontal bottom plate that is supported by said baseplate to impart shear wave energy to said baseplate.

21. A method according to claim 20 wherein at least one of steps (3) and (4) is carried out by hydraulic cylinder/piston means.

22. A method according to claim 20 of downwardly displacing said bottom plate into lateral interlocking relationship with said baseplate prior to step (4).

* * * * *